United States Patent [19]

Cushing et al.

[11] 4,348,724
[45] Sep. 7, 1982

[54] ADDRESS PAIRING APPARATUS FOR A CONTROL STORE OF A DATA PROCESSING SYSTEM

[75] Inventors: David E. Cushing, Chelmsford; Philip E. Stanley, Westboro, both of Mass.

[73] Assignee: Honeywell Information Systems Inc., Waltham, Mass.

[21] Appl. No.: 140,643

[22] Filed: Apr. 15, 1980

[51] Int. Cl.³ .............................................. G06F 9/26
[52] U.S. Cl. ................................................... 364/200
[58] Field of Search ... 364/200 MS File, 900 MS File

[56] References Cited
U.S. PATENT DOCUMENTS 4,050,058  9/1977  Garlic ................................. 364/200
4,058,850 11/1977  Sheikh ................................ 364/900

*Primary Examiner*—Harvey E. Springborn
*Attorney, Agent, or Firm*—John S. Solakian; Nicholas Prasinos

[57] ABSTRACT

A data processing system includes a first memory for storing microinstructions in a first plurality of storage locations and second memory for storing microinstructions in a second plurality of storage locations. A central processor executing a series of addressed microinstructions to control the functions performed by this system generates the address of the next microinstruction to be executed in series as well as a next address selection signal. Addressing circuitry concurrently applies the next address generated by the processor to address inputs of each of the first memory and the second memory. After a predetermined delay, either the first memory or the second memory is selected to output an address microinstruction responsive to the value of the next address selection signal.

3 Claims, 10 Drawing Figures

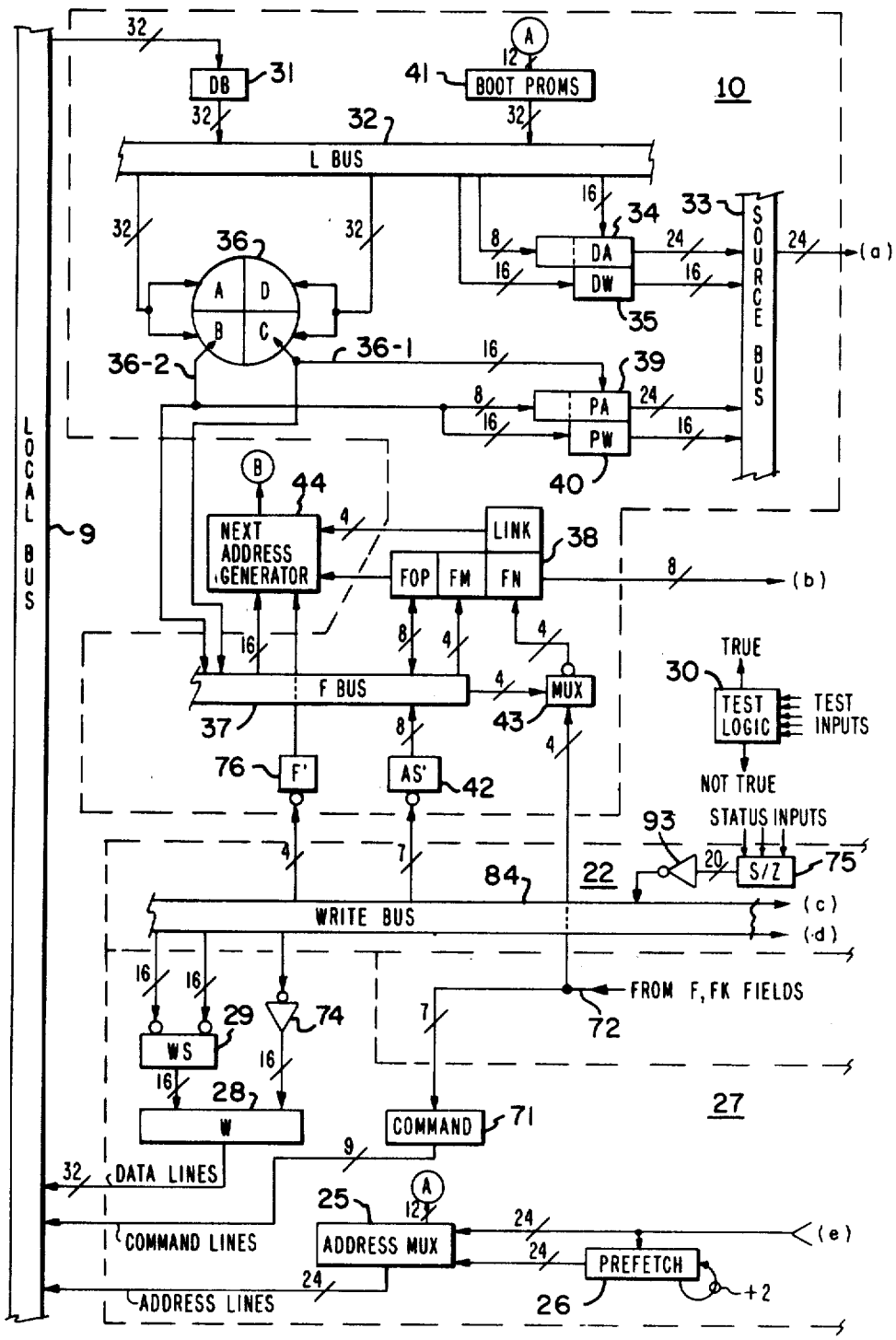
FIG. 2 (SHEET 1 OF 2)

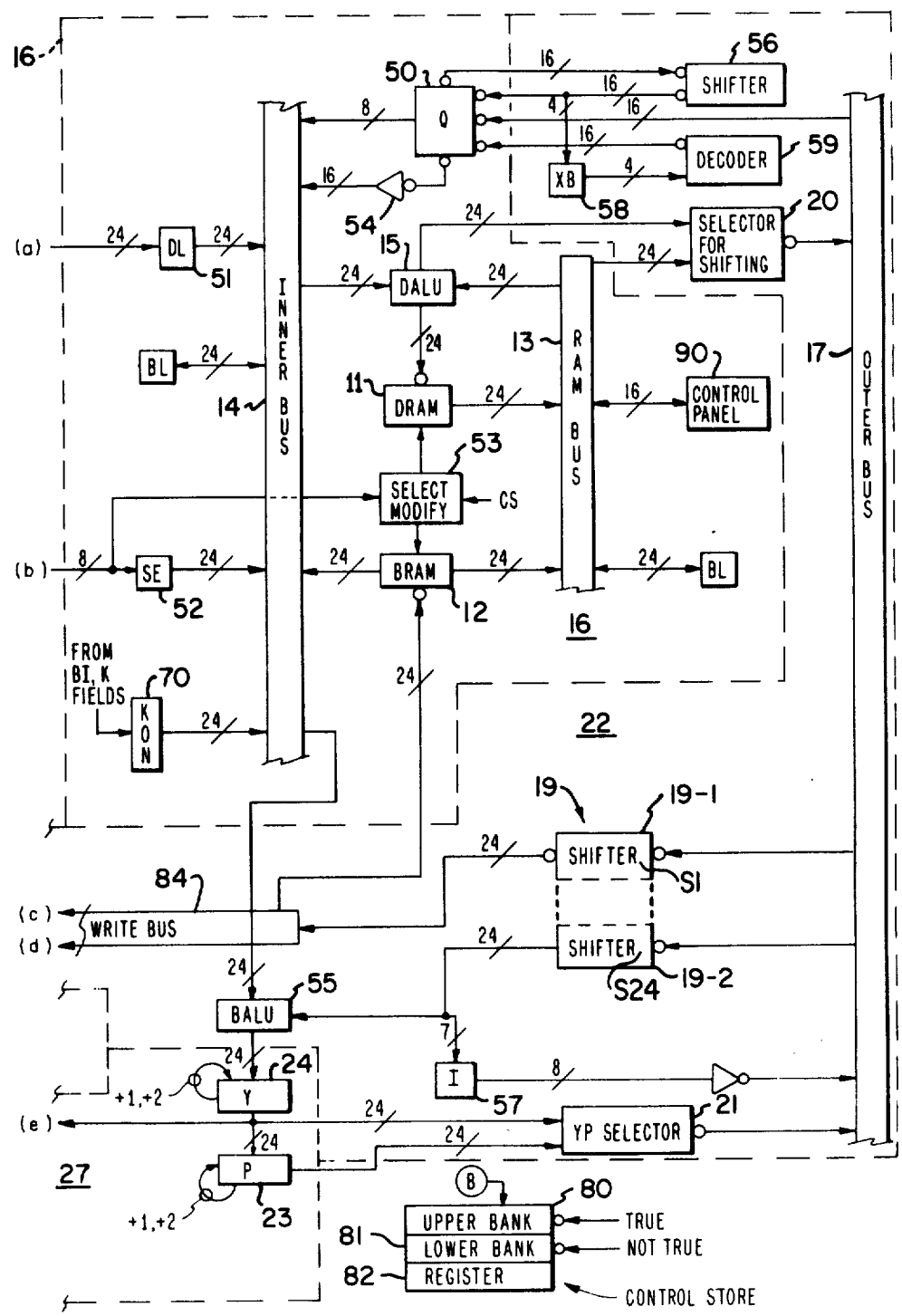
FIG. 2  SHEET 2 OF 2

|  | LOWER BANK | UPPER BANK |
|---|---|---|
| X0 | NA(1-10) | NA(1-9),NA(A) |
| X1 | NA(1-10) | NA(1-9),NA($\overline{A}$) |
| XA | NA(1-10) | NA(1,2),XA PROMS(5)(3-10) |
| XB | NA(1-10) | NA(1,2),110,F(12),XB PROM(1)(7-10) |
| XR | NA(1-10) | NA(1,2),000,CF=(KOP),XR PROM(1)(7-10) |
| XE | NA(1-10) | NA(1,2),KOP,F(0),#=0,F(4-8)(6-10) |
| XW | NA(1-10) | NA(1,2),0,OD SIZ PROM(1)(4-6), 1,OD/ADDR. PROM(8),XW PROM(9,10) |
| XL | NA(1-10) | NA(1-6), LINK(7-10) |

*FIG. 6*

ADDRESS PAIRING APPARATUS FOR A CONTROL STORE OF A DATA PROCESSING SYSTEM

BACKGROUND OF THE INVENTION

The present invention generally relates to data processing systems and more particularly to control stores included in such systems.

Many of the data processing units being developed include a so-called control store which includes a plurality of storage locations each having a control store word or so-called firmware word stored therein. The control store is used to execute a desired set of machine operations in order to achieve the required result. The control store is the heart of the control mechanism in the data processing unit. Thus, the speed of operation of the processor is directly dependent in large part on the speed of the control store. Increased speed of the control store has been accomplished in many ways, such as by use of faster memories, faster logic and various time saving techniques, including improved architecture and timing schemes. Various techniques have also been used to reduce the size of the control store to have a minimum number of locations, thereby reducing space and cost requirements, and also facilitating the use of faster memories.

It is accordingly a primary object of the present invention to provide an improved control store and associated logic for use in a data processing system.

SUMMARY OF THE INVENTION

The above and other objects of the invention are obtained by providing a microinstruction storage and transfer apparatus in a data processing system wherein a processor executes a series of addressable microinstructions to control the functions performed by the system and wherein the execution of a microinstruction by the processor generates the address of the next microinstruction to be executed and a next address selection signal having either a first value or a second value, the microinstruction storage and transfer apparatus comprising a microinstruction output register, a control store comprising a first memory for storing microinstructions in a first plurality of storage locations, the first memory being addressed by the microinstruction addresses generated by the processor, the first memory for selectively outputting from a first output terminal microinstructions stored in the first plurality of storage locations responsive to the addresses generated by the processor and having a first output enable terminal for controlling the outputting of the addressed microinstruction from the first output terminal and a second memory for storing microinstructions in a second plurality of storage locations, the second memory being addressed by the microinstruction addresses generated by the processor concurrently with the addressing of the first memory, the second memory for selectively outputting from a second output terminal microinstructions stored in the second plurality of storage locations responsive to the addresses generated by the processor and the second memory having a second output enable terminal for controlling the outputting of the addressed microinstructions from the second output terminal, connection circuitry for coupling the outputs of the first memory and the second memory to the microinstruction output register, and circuitry for concurrently supplying the next address selection signal to the first output enable terminal and the second enable terminal to enable the first memory to output the addressed microinstructions when the next address selection signal has the first value and to enable the second memory to output the addressed microinstructions when the next address selection signal has the second value.

BRIEF DESCRIPTION OF THE DRAWINGS

The manner in which the apparatus of the present invention is constructed and its mode of operation can best be understood in the light of the following detailed description, together with the accompanying drawings, in which:

FIG. 2 is a detailed block diagram of the central processor of the present invention;

FIG. 6 is a table illustrating the signals used for addressing the control store in response to various branch conditions;

DETAILED DESCRIPTION OF THE PREFERRED EMBODIMENTS

Figure 1:
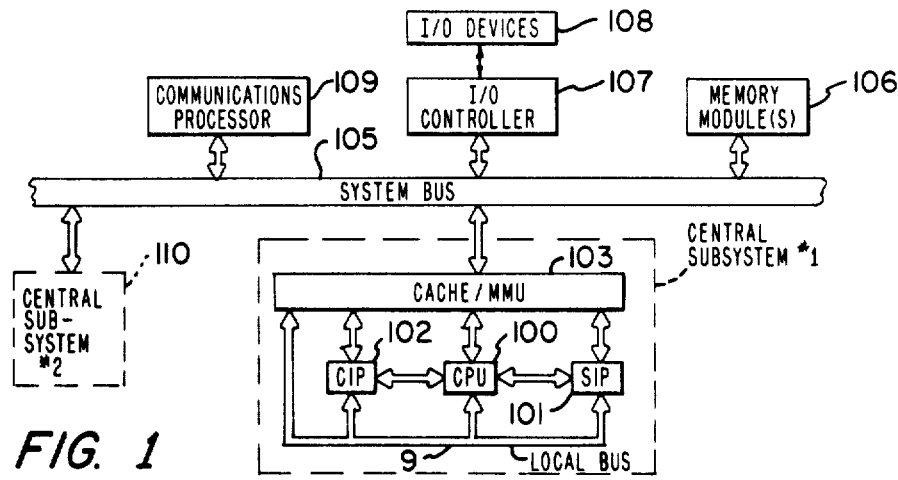
FIG. 1 is a general block diagram of the system in which the apparatus of the present invention is included.

FIG. 1 is a general block diagram of the configuration of the system in which the CPU of the present invention may be included. Such system, includes one or more central subsystems. Each central subsystem includes a central processor (CPU) 100, and optional processors which may include a scientific instruction processor (SIP) 101 and a commercial instruction processor (CIP) 102. These optional processors may be used to extend the range of the basic processor 100 for special applications. A central subsystem may also include a Cache/MMU (Cache memory/memory management unit) unit 103, which communicates over a bidirectional system bus 105 to system memory modules (main memory) 106, input/output (I/O) controller 107 coupled to I/O devices 108, and a multiline communications controller or processor (MLCP) 109.

The central subsystem processors are connected to each other by way of a local bus 9 and they are connected to the rest of the system by way of the Cache/MMU unit 103. The function of the Cache/MMU unit in the central subsystem is to provide a buffer storage for the portion of main memory 106 that is currently being used by the processors, and to provide for translation of the main memory address. The function of the local bus is to provide an interconnection among the three processors and the Cache/MMU unit. There is one local bus 9 which is organized into numerous interfaces. As shown in FIG. 1, there are private interfaces between the CPU 100 and the other two processors. There is also a private interface from each processor to the Cache/MMU. The local bus is a time-shared or public interface, that is, shared by all three processors and the Cache/MMU. In addition, the Cache/MMU 103 provides an interface via the system bus 105 to the rest of the system, primarily the memory 106 and the I/O devices 108 via controller 107.

The CPU block diagram of FIG. 2 will now be discussed. More particularly, the various electrical buses and functional units and their interrelationships shall be discussed. The primary elements of the CPU are shown within the dotted lines. A first such primary element is the local bus interface 10 which includes a data buffer, a round robin procedure storage buffer 36, and various procedure/data word and address multiplexers (muxes) coupled with a source bus 33 as well as other devices to be discussed. The first primary element 10 is utilized for the purpose of receiving data from the local bus 9.

A second primary element 16 is the arithmetic element and includes several devices including two sets of register arrays (RAMS) called the DRAM 11 and the BRAM 12, and the RAM or R Bus 13, which RAMS 11 and 12 connect to. The second primary element 16 also includes the Input or Inner Bus 14 which the BRAM, as well as other devices, and also includes the DALU 15, i.e., the arithmetic logic unit, which is coupled to drive the DRAM 11.

A third primary element 22 of the CPU is the data transfer section of the CPU and includes the Outer Bus 17 and the Write Bus 84, the shifters 19-1 and 19-2 which connect them, and the selectors which drive them. These selectors include the DALU/R Bus selector 20 and the Y register/P register (YP) selector 21.

A fourth primary element 27 is the address section of the CPU and includes the procedure address register (P) 23 and the data address register (Y) 24. It also includes the address multiplexer 25 and the prefetch address register 26. Also included in element 27 is the write data register (W) 28, and the write data selector (WS) 29. This portion of the CPU is utilized for the purpose of transferring data to the local bus 9.

Figure 5:
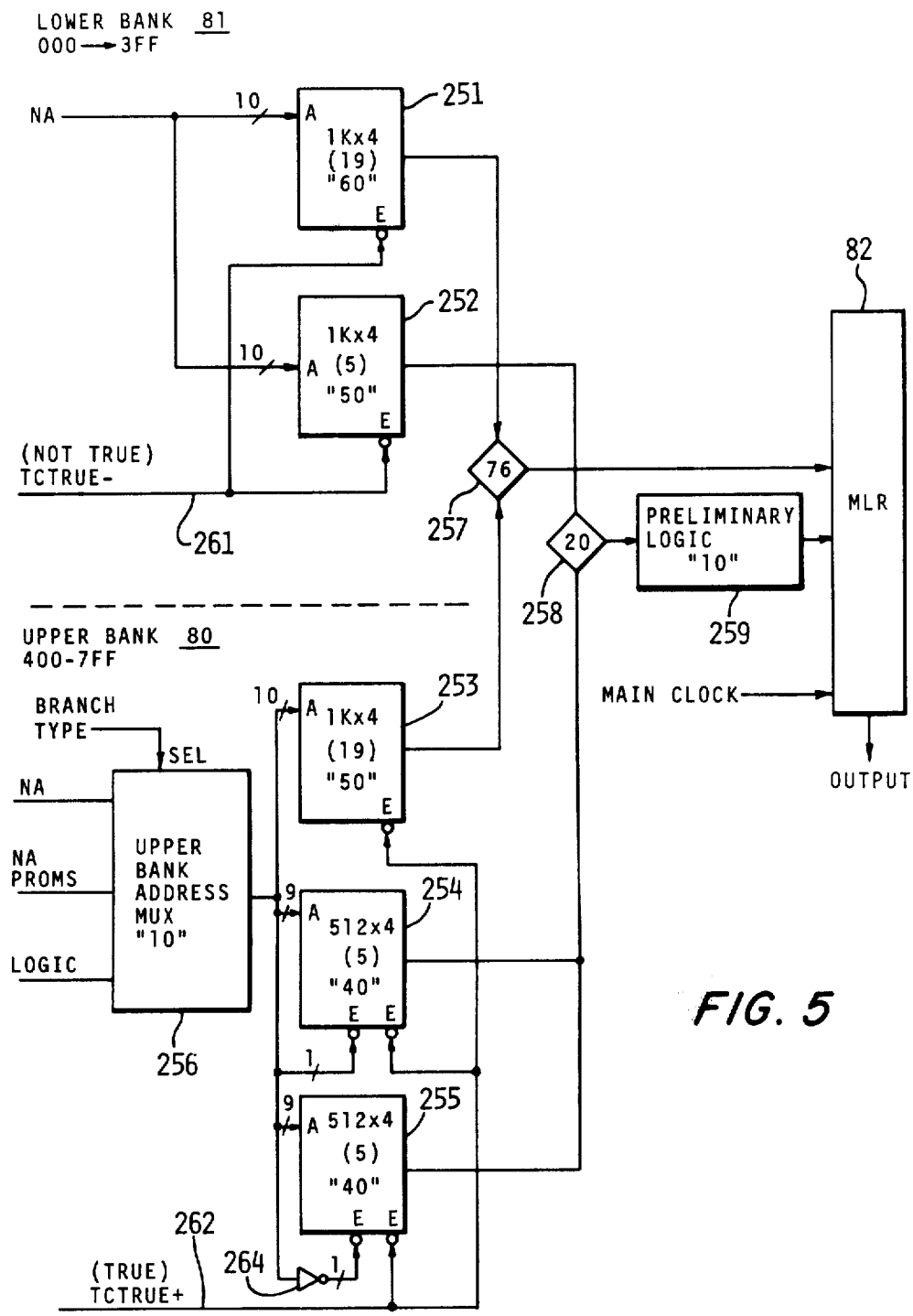
FIG. 5 is a detailed block diagram of the control store and associated logic included in the central processor of the present invention.
Figure 7:
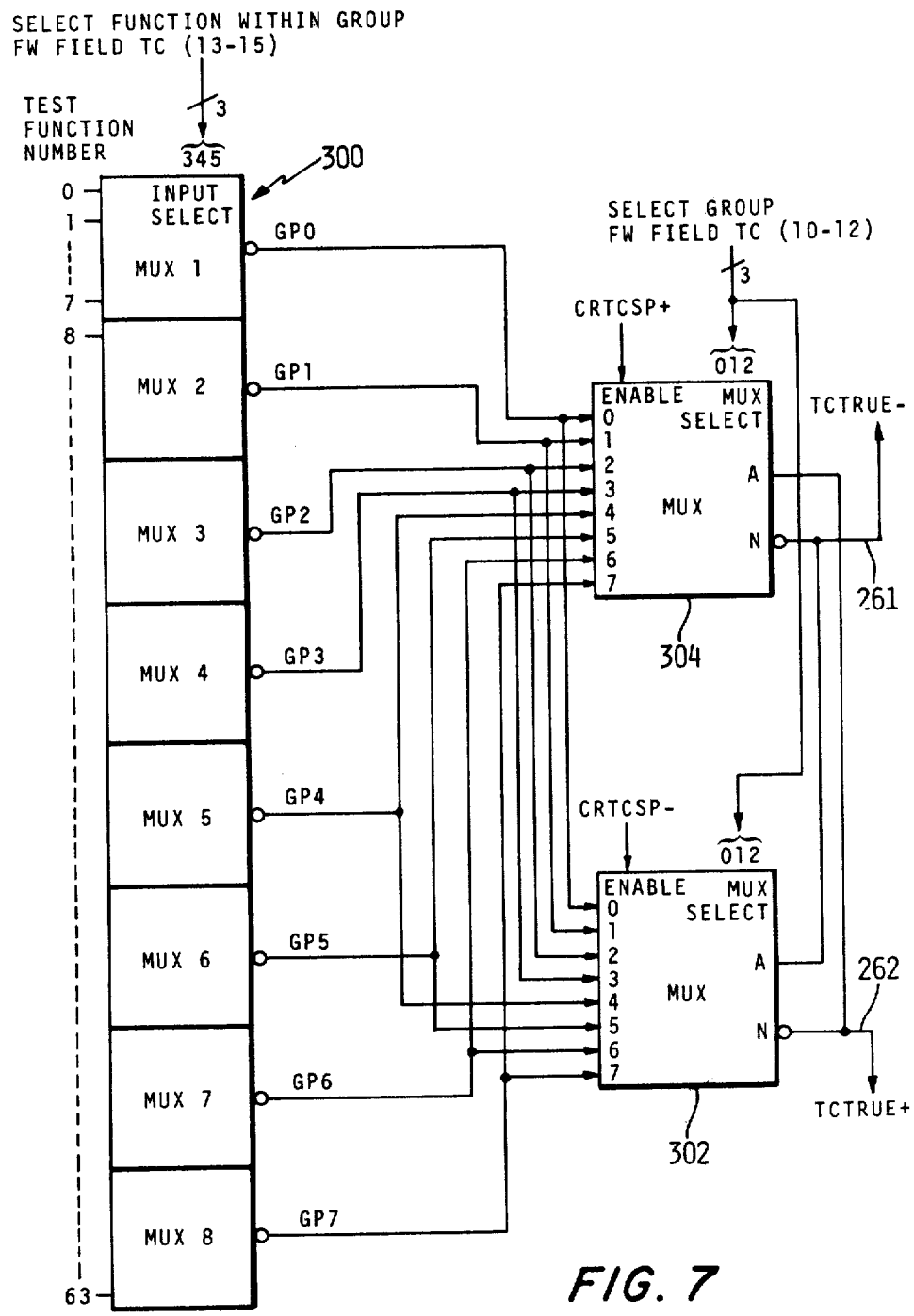
FIG. 7 is a detailed block diagram illustrating test logic used to enable the control store of the central processor of the present invention.

Device 30 is the test logic of the CPU, which as shown in FIG. 7, includes a set of eight-to-one multiplexers which in turn drive a second set of at least two eight-to-one multiplexers to generate a single binary signal called "Test True" or "Test False", which is then used to control branching in the firmware. The Test True and False signals are coupled to the PROMS included in the control store banks 80 and 81 as shown in FIG. 5.

The next address generator 44 is coupled to the F register 38 and the F Bus 37. The next address generator is primarily concerned with generating firmware addresses for use in the CPU.

The function of element 10, which is the local bus data input area, is to receive data which is returning from the Cache/MMU or from other devices on the local bus, to select data from the bootstrap PROMs if a bootstrap procedure execution is requested and to direct such data to the appropriate data buffer. If an instructional fetch is called for, the data is placed in the function register. More particularly, the primary data buffer 31 receives 16 or 32 bit data words from the local bus 9. Its output is connected to the L bus 32. The L bus is used both to drive the source bus 33 by use of a pair of selectors DA 34 and DW 35 and to drive the four-word procedure buffer 36. Non-procedural data enters the CPU via the source bus 33 which is driven from the data selectors from the L bus 32. Procedural data enters the CPU via a different set of selectors, PA 39 and PW 40, coming from the procedure buffer 36. The procedure buffer has the responsibility of containing the next two or three words of the procedure to be executed, so that when they are required, time will not have to be spent fetching them. It is automatically reloaded from the Cache/MMU via the local bus as it is emptied by the CPU.

The F bus 37 is a special bus which is used for gating information for the F register 38, i.e., the four areas labeled FOP, FM, FN and Link. The F register is the primary instruction register of the CPU. The function of the F bus 37 is to take data from the F register 38 and provide data to the F register from various sources. There is also a multiplexer 43 which allows the loading of either constants or data from element AS' 42 into either the Link or the FN area of the F register 38.

Also in the element 10, which is the data input area, there is a set of bootstrap PROMs 41 which can be used to provide instructions, in place of instructions from memory if operating in the bootstrap mode.

The storage device 36 having locations A, B, C, D, is a round robin four-word procedure store. Whenever it has room for two words of procedure, i.e., it is at least half empty, then it automatically initiates a memory read of procedure via the local bus 9, from the Cache/MMU. The returning data is dropped into the next two locations which are available in this round robin store. As the CPU uses procedures by either emitting it to the source bus 33 for use inside the processing elements of the CPU, or by sending it to the F register 38 because it is part of an instruction, then the two pointers 36-1 and 36-2, which represent in effect cursors in the round robin store, advance to the next location available by use of a counter included in device 36 which successively enables the four locations to the outputs of device 36. The left-hand cursor or pointer 36-2 indicates the next word or procedure to be fetched; the right-hand cursor 36-1 represents the word following that. Sometimes one word of procedure is used up in which case the word indicated by the left-hand cursor would be used to generate the information, passing through the PW multiplexer 40. Sometimes there is a requirement for two words of procedure (as when pulling a large address form (LAF) address. Then the words indicated by both the left-hand and the right-hand cursors are combined in the PA multiplexer 39 of the procedure selector. This will be described more fully when this logic is described.

Thus, element 10 is the area concerned with bringing data into the CPU to the source bus, via either data selectors 34 and 35, or the procedure selectors 39 and 41, or bringing data directly into the instruction (F) register 38 via the procedure buffer 36 and the F bus 37. Device (F') 76 is used to hold selected bits from auxiliary address information or syllables. The address syllable is actually part of a 16-bit data descriptor. Certain bits in the descriptor have to be retained for subsequent analysis. The operand-size bit in the CIP descriptor and the operand size and signed versus unsigned bits in the K register descriptor have to be retained. These are retained in the four-bit F' register 76.

The second element 16 contains the arithmetic/logic unit (DALU) 15, the BRAM 12 and the DRAM 11, containing most of the programmer-visible registers, plus a number of non-programmer visible registers. These data storage elements are organized as follows: The DRAM 11, which is one of the two sources which can drive the RAM bus 13, contains 32 locations, each of which is 24 bits wide. These locations are used to hold so-called D registers, two halves (K & L) of the so-called K registers which are 32 bits long, a number of internal pointers, and seven so-called M registers. The BRAM 12, which contains 16 words, each 24 bits wide, contains the seven base registers plus a number of programmer-visible and programmer-invisible pointers of various types.

Figure 3:
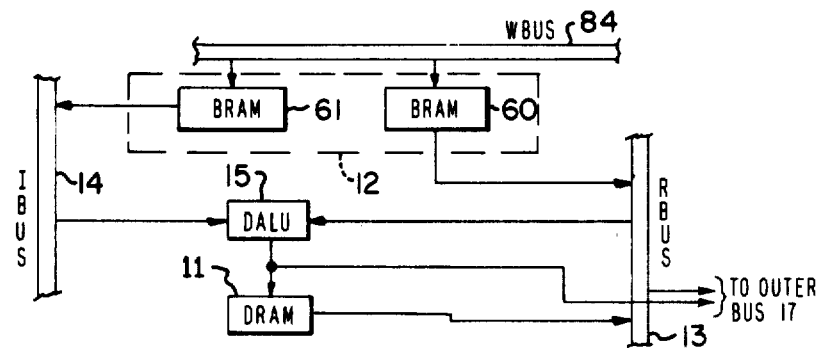
FIG. 3 illustrates details of the connections to the arithmetic logic unit of the central processor of the present invention.

FIG. 3 shows in more detail the relationship among the RAMs, the buses, and the DALU 15. The DRAM and the BRAM can each be sources to the RAM bus 13. The BRAM 12 is actually a dual structure; that is, there are two parallel BRAMs 60 and 61 in the CPU. The two elements of the BRAM are loaded identically. One such element which drives (or transfers data to) the R bus is element 60, and the other which drives the I bus 14 is the BRAM element 61. The important aspect of the two identical BRAMs is that the system speed is increased.

The R bus can be driven either by the BRAM 60, or by the DRAM 11. Other sources, as will be seen, also drive the I bus 14. The DALU 15 uses the I bus and the R bus as its inputs and the output of the DALU can then be recycled to the DRAM and/or used elsewhere in the CPU.

Element 16 includes two buses of major interest. The so-called Input or Inner bus (I) 14 is the primary source of original input within the processor, that is, data from memory comes into this bus as does the output of the Q register 50 via driver 54, and also the output of the BRAM 12. The second bus, the so-called R or RAM bus is the point at which the outputs of the two different RAMs, the BRAM and the DRAM, are coupled. The outputs of these two buses are the inputs to the DALU 15, which generates data which can either be returned into the DRAM or sent to the outer bus 17 for further processing in the sytem.

Both the inner and the RAM buses employ a hardware element referred to as the so-called "batlatch" (BL) which is a gate whose input and output are tied together for coupling to signals on the bus. This batlatch is intended to take over control of that signal after the driving source is required to go off the bus for timing and sequencing reasons. When this happens, the batlatch then supports that signal at the same level as it was when the driving sources were present, until the batlatch is turned off at which time the bus signal can relax (go to a predetermined level such as zero volts).

The RAM bus 13 is the interface for the transfer of data between the control panel 90 and the central processor, and is connected to it via 16 bidirectional signal lines. Memory data couples to the Inner bus 14 via a set of drivers called the data latches (DL) 51. The data latches are paralleled by a second series of latches called SE or sign extension latches 52. These SE latches are used either to sign or zero extend the data latches when they are providing only a sixteen bit quantity to the 24 bit bus. Similarly, the SE logic 52 is used to take either 7 or 8 bits of the current instruction, and sign extend it to 24 bits for use by the branch and value instructions which get their displacement and their operand, respectively, from the right-hand portion of the instruction word.

There is also associated with the BRAM and DRAM logic called the select/modify logic 53, which allows the DRAM and the BRAM to be addressed in blocks of eight registers, using various fields in the instruction to control the individual register selection within that block.

Constant generator (KON) 70 is also included in element 16, the primary ALU area, and is another source to the Inner bus 14, that is, it is the source that can be used to generate 24 bit constants, based on inputs from the BI and K fields of the control store word, onto the Inner bus for use by the arithmetic unit under control of the firmware.

Thus, element 16 is the primary arithmetic operation area in the CPU; that is, it is concerned with operand manipulation, with the generation of operands for insertion into the data RAM, or operands which are intended to be sent to the Outer bus, either to be returned to the BRAM, or to be sent to the various address and data registers for output to the local bus 9.

Element 22 is concerned primarily with the section of the CPU referred to as the Outer bus, and the write bus. The Outer bus is the bus upon which various data paths are collected, i.e., the Y register, the P register, the output of the DALU and the RAM bus. The Write bus is the bus which is used to transfer operands to the BRAM, to the write data registers, and to the BALU 55 which is the ALU primarily responsible for address manipulation.

Between the Outer bus 17 and the Write bus 84, is a set of twenty-four multiplexing shifters 19, which allow shifts of 1, 2 or 4 bits in either direction on Outer bus 17 operands. In addition, there is also a set of sixteen multiplexing shifters 56 which are used to load operands into the Q register.

Two of the four different types of operands which are transferred to the Outer bus originate at the DALU and at the RAM bus and are selected through a two-to-one selector 20 coupled to Outer bus 17. Two other sources for the Outer bus are the Y register, which is the data address register, and the procedure address (P) register. The outputs of these two units are coupled via a two-to-one selector (Y/P selector) 21 and sourced onto the Outer bus 17. Also coupled to the Outer bus 17 is the I register 57, the indicator register for the central processing subsystem. The contents of the Outer bus 17 can be transferred either directly or shifted to the Write bus 84 for further processing in the CPU. They can also be loaded into the Q register 50 directly so that the Q register can be used for double-precision shift operations.

All shifting which takes place within the CPU takes place by manipulation of operands between the Outer bus and the Write bus. The twenty-four shifters 19 are used to shift 24 bit operands, the size of the operands on the O bus 17 and W bus 84, left or right under the control of the control store word. They can shift by either 1, 2, or 4 positions, transfer the operand straight through, or transfer the operand through with the two right-hand bytes of the operand interchanged. The operation of these shifters is controlled by a special field in the control store word. This section of the CPU is used for 24 bit operands shifts. When 32 bit (double register) operands, are shifted, the right-hand operand is loaded into the Q register via the Outer bus, and then a shift is performed in which not only the W bus shifters 19, but also the sixteen Q register shifters 56 are operated. The Q register contents are thereby treated as a 16 bit extension on the right-hand end of the 24 bit operand which is being shifted onto the W bus 84; the ends of these two shifters are coupled together, thus allowing a 40 bit shift to occur. In such double register shifts, the operands of interest are the 16 bits which are returned to the Q register and the 16 bits which are transferred to the right-hand two bytes of the Outer bus, while the left-hand eight bits of the W bus data are usually discarded.

Element 75 represents the collection of the status bits in the CPU for emission to the W bus via driver 93 under certain conditions. The W bus has two sources, the primary one being the shifter 19 from the Outer bus 17. This shifter 19 can be disabled as an input to bus 84 and instead the status bits (S/Z) 75 can be placed on the Write bus 84 for subsequent analysis by the firmware.

One unit of hardware which is associated with the Q register which has not been previousy discussed is the XB register 58 and the decoder 59 coupled thereto. The XB register 58 is used during index shifting to capture those bits of the index which are shifted right for sub-word operands and which would be lost because they move to the right of the single word bit in the address. They are captured in the XB register, one bit for half-word shifts, two bits for digit shifts, and four bits for bit-sized operand shifts. The XB register contents are subsequently used to directly control left versus right half selection when dealing with half-word operands, when generating a parameter to be sent to the commercial instruction processor for digit operands, and to generate a mask of 15 binary zeros and a single binary one, in conjunction with the decoder 59, when operating on bit operands. That is, for a bit operand, a word is read, a mask is used to set or clear the selected bit in the word, and then the word is written back into the memory. The mask is generated from decoder 59 and is an input to the Q register 50. That is, one of the items which can be loaded into the Q register is the decoder mask generated from the contents of the XB register 58.

The fourth primary element 27 in the CPU is concerned with the generation of addresses, commands and operands for transmittal to the local bus 9, and via the local bus to either the CIP, the SIP, or the Cache/MMU and hence, to memory or to Input/Output (I/O) devices. This primary element can be broken down into approximately three areas, the first being the write data register (W) 28 and the write selector (WS) 29. Register 28 is a 32 bit register with a partitioned load capability, that is, either the right half or the left half, or both halves of this register can be loaded. The right half is always loaded from 16 bits of the Write bus 84 via drivers 74. The left half is written with data which comes from the write selector 29. This write selector has as its 16 inputs either the 16 bits of the right half of the Write bus or the eight left-hand bits of the Write bus. The Write bus is the primary path by which data can be sent to the W register 28 in order to subsequently write such data to any other device coupled on the local bus.

The next (second) area in the local bus output interface 27 is the command driver 71. The command driver 71 drives a series of command lines which accompany all transfers by the CPU on the local bus and indicates to the Cache/MMU either a memory reference cycle, an I/O reference cycle, or a local bus reference cycle to the Cache/MMU or one of the local bus processing units. The information which is transferred from line 72 onto the command lines is derived from the F and FK fields of the control store or firmware (FW) word shown in FIG. 4, which also at other times controls the functioning of the F register 38 of element 10.

The third portion of element 27 includes the two primary address registers, i.e., the Y register 24, for non-procedural memory addresses and for addresses to other devices on the local and system buses, and the P register 23 (the program counter), and the prefetch register 26.

The P counter 23 keeps track of the last word which the firmware has used, which word has been taken from the round robin buffer 36 and input to the CPU for operations thereon. The prefetch (PF) register 26 keeps track of which word is to be next fetched from memory; that is, the P and PF registers may differ by any number in memory address from one to four words, depending on how full the round robin buffer is and how recently the central processing system has taken data from the buffer. If the central processing system has taken all the data from the buffer, it takes a finite amount of time for the Cache/MMU to respond with new data in response to a request, and fill buffer 36 again. Under those circumstances, the prefetch register 26 and the address of the P counter or register 23 would be close together or the same in address content. When the buffer 36 is full, and the CPU has not taken any data recenty, then the P register will be either two to four words behind the prefetch register because it is indicating the last word taken and the prefetch register indicates the next word to be sent forth from memory as soon as there is room for it in the prefetch register.

The contents of the P register 23 are never admitted to the local bus as a memory address source. The two sources for data which can go to the local bus via the virtual address multiplexer 25 are the Y register 24, which is used for all non-procedural fetches, and the prefetch register 26, which is used automatically by the prefetch logic to go to memory and request words for use in subsequent firmware steps.

The arrows on devices 23, 24 and 26 are indicative of the incrementing capability of those particular registers. That is, the P register can increment by either one or two words depending on the number of words which are taken out of the prefetch buffer at a time. That is, pulling one word from the prefetch buffer 36 automatically increments the P register by one; pulling two words from the prefetch buffer 36 automatically increments the P register by two. The prefetch register always increments by two, because prefetches are always performed on a pair of words. The Y register can increment by either one or two under the control of the firmware as it is used, or in preparation for future use. There is a bus control field in the firmware word which allows control of such incrementing and the various cycle requests to the local bus.

The inputs to the W register 28 are two 16-bit data paths which are exercised in various ways. If it is desired to write a 24-bit address, then the drivers 74 are turned on enabling the right hand 16 bits of the Write bus to be transferred to the right-hand 16 bits of the W register. The multiplexer 29 is conditioned such that the left-hand eight bits of the Write bus and eight leading (most significant) binary zeros are emitted to the left-hand half of the W register 28. This loads a two-word, 24-bit, address into the W register for subsequently writing into memory. If it is desired to write a single word into memory, then the right half of the W register is not clocked (i.e., enabled), and does not change; and the multiplexer 29 is conditioned to enable the 16 right-hand bits of the Write bus to the 16 left-hand bits of the W register where they are clocked in. For single word writes, the left half of the W register is the data that is written into memory.

The logic heretofore described is used to request and accept data from other entities on the local bus, such as the Cache/MMU or the CIP or the SIP, to operate on it and store it internally in various registers via the two ALUs which are contained in the system, to create new operands which are subsequently modified and sent out to the local bus to one of the entities thereon with an address of which entity (computed internally in the CPU and used to control the local bus). All of these operations are performed under the control of control firmware which is stored in a 2,048-word by 96 bits-per-word control store divided into an upper bank 80 and a lower bank 81 which is included in the CPU.

Figure 4:
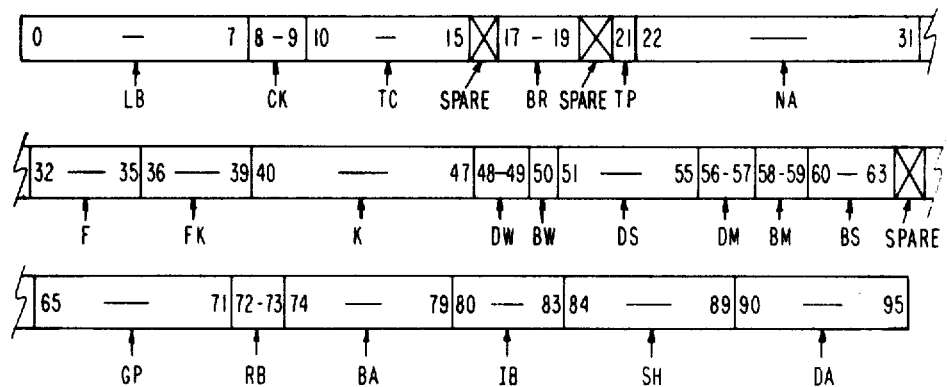
FIG. 4 illustrates details of the composition of locations of the control store included in the central processor of the present invention.

The control store is partitioned into a number of individual fields, each of which controls some aspect of the internal performance of the CPU. FIG. 4 illustrates the firmware word and the various fields of interest therein. The first of these fields is the local bus (LB) field, bits 0 through 7 of the control store. The LB field is concerned with the requesting of various cycles from the local bus and the responses thereto. It is also responsible for the emission of virtual addresses via the pre-fetch register or the Y register, and it controls the various incrementing of the Y and P registers. The local but field also controls the successive reading of data from the round robin procedure buffer 36, and the enabling of the data and procedure multiplexers 34, 35, 39 and 40 respectively, onto the source bus 33 for subsequent use by the Inner bus 14.

The next field, the clock (CK) field, bits 8 and 9 of the control store, is used to control the CPU clock speed, i.e., the interval between successive clock pulses in the CPU. Each firmware step has assigned to it the clock speed which is appropriate to its complexity. In the system of the present invention, there are four possible intervals between successive clock pulses, for example, 85 nanoseconds, 100 nanoseconds, 115 nanoseconds, or 130 nanoseconds. Which of these is used for a firmware step is controlled by the CK field for that firmware step.

The next field is the TC field, bits 10 through 15 in the control store. This is a 6-bit field and selects one of 64 possible logic functions within the CPU for testing and control of firmware sequences.

The next field is the BR field, bits 17 through 19, and is used to control the type of action which is taken as a result of a test condition, that is, what type of branch occurred, whether the branch simply selects between two firmware steps, or whether it selects between a firmware step and a so-called control store splatter (the generation of one of a multiplicity of control store next addresses based on the state of one or more logic elements in the CPU) in which the next address is controlled by some function of the F register 38 contents.

The next field of interest, the TP field, bit 21, is the Test Polarity field. It controls whether the test condition is tested for true or for false.

The NA field, bits 22 through 31, is a ten-bit field which is used to generate at least one of the two addresses which are selected by all branches. The other address is either also derived from the same NA field or from the control store splatters previously mentioned.

The next field, bits 32 through 39, is the F register control field, partitioned into a four-bit part called F and a second four-bit part called FK. The F and FK fields are used to control the loading and strobing of various elements in the F register and in the area of the F bus; that is, it is used to control the strobing of F' and AS' devices, the subparts of the F register 38 and the multiplexer 43. Which of these devices are loaded and what sources they have for their loading are all controlled by the F and FK fields.

The next field, bits 40–47, is the K (i.e., Constant) field, and is used to drive the I bus 14. It is an 8-bit field which provides the right-hand eight bits for all constants which are admitted to the I bus. The left-hand 16 bits of the constant are controlled by the I bus field which will be discussed hereinafter. The K field is directly related to the KON device 70.

The next field in the control store, bits 48–63, is concerned primarily with the addressing the control of the DRAM 11 and the BRAM 12. The two-bit field, DW, is used to control writing into the DRAM with one bit controlling write operations into the leftmost (most significant) 8 bits of the DRAM, and the other bit controlling write operations into the rightmost (least significant) 16 bits. The next bit, bit 50, (field BW), is used to control write operations into both parts of the BRAM, which are always written into together. The next field DS is five bits in length and provides the selection of one of 32 registers in the DRAM 11. The DM field, bits 56 and 57, is the select-modify field associated with the DRAM and allows the selection of either the DRAM directly or any of three different functions of the F register 38 for qualifying the addressing of the DRAM.

The next field of interest is the B select field (BS), bits 60 through 63, which is used for the selection of one of the 16 registers in the BRAM. The two-bit field comprising bits 58 and 59, is the select-modify field (BM) for BRAM addressing. It performs similarly to that for the DRAM addressing except that it is separate so that independent select and modify functions can be specified for both the BRAM and DRAM.

The next field of interest is the GP field, which is seven bits in length (bits 65–71), and is used to control a large number of general purpose micro operations within the processor, such as the clocking of various bistable flip-flops and the enabling of various control functions. It is also used to control access to the control panel from the CPU, to input and output data to the control panel, and to control various flip-flops therein.

The next field, the RB field, bits 72 and 73, is used to control the sourcing of data onto the R bus 13 with one bit controlling the BRAM and the other bit controlling the DRAM.

The BA field, bits 74 through 79, is used to control the functions of the BALU 55, the arithmetic/logic unit which has as its inputs the I bus and the W bus and which can be used to drive the Y register 24. These six bits are used as follows: one as a carry inject to the BALU, one for logic/arithmetic control, and the other four to select particular functions.

The next field of interest is the IB field, bits 80 through 83, and is used to control which data source is enabled to the Inner bus 14. This field can enable the data latches, sign extend the F register, or select a constant, or the BRAM in various combinations to the I bus. The next field, the SH field, bits 84 through 89, is used to control both the shifters and the W bus sourcing which was discussed earlier. These six bits enable the system to have a large amount of antonomous control over what registers are enabled to the W bus and whether or not the Q register loads and in what direction the shifters shift the operand as it passes through.

The final field, the DA field, bits 90 through 95, is the function control for the DALU 15 with six bits having analogous functions to those in the BA field, i.e., one bit is a carry inject, one bit selects logic versus arithmetic and the other four bits are to select particular functions.

The control store for the CPU is actually two control stores: an upper bank 80 and a lower bank 81. The upper bank is addressed by the next address generator 44 and the lower bank is addressed directly by a portion of the contents of the then current control store word. In the case of the more common types of branches, both use the NA field of the control store word as the basic source of the next address, and modify it in some way so that the two addresses which go to the upper and lower bank are essentially identical. In the case of the other branches, those which select between a next address and a PROM generated splatter, the lower bank receives the next address field unchanged from from the current control store word, while the upper bank receives the splatter address from the current control store word. The control store is partitioned in this way so that the system can be doing a simultaneous access of both possible next address control store words and can postpone the decision of which one is going to be used until almost the very end of the current control store step, just prior to clocking the data into the control register 82. The details of the control store shall be discussed hereinafter.

The manner in which the CPU and firmware interact to perform certain typical central processor operations, such as (a) reading a word from memory; (b) computing a next address for reading another word from memory; (c) writing a word into memory and (d) performing some type of iterative algorithm in which the operations are entirely internal to the CPU, will now be discussed. The situations given will be typical and representative operations will be described.

In the case of reading a word from memory, during a control store step, the control store word will enable the virtual memory address of the word from the BRAM 12 onto the RAM bus 13 via the RB, BS, and BM fields. Then the SH field will condition the Outer bus and the W bus sourcing such that the RAM bus is enabled through the selector 20 to the Outer bus 17, and then unaltered through the shifter 19 onto the W bus 84. The W bus is an input to the BALU 55, which is conditioned by the BA field to enable its W bus input directly to its output. At the same time, the LB field will cause the Y register 24 to load, thus transferring the address into the Y register.

In the next firmware step, the LB field then causes a request to be directed to the local bus indicating that a memory request is required and that the address provided to the local bus should be used to make such request. The command lines 71 are conditioned by the F and FK fields (shown as box 72 in FIG. 2) to indicate the memory read request is required. The address multiplexer 25 is conditioned to enable the contents of the Y register onto the local bus via the 24 address lines. The Cache/MMU memory, which monitors and controls all activity on the local bus, acknowledges the request, while the CPU proceeds to the next firmware step. In the next firmware step, the local bus field will then specify a stall, indicating that the CPU should not leave this firmware step until the end of the local bus cycle has been detected returning the data from the Cache/MMU via the local bus into the CPU data buffer. As soon as this return is detected, then the stall ends, and the CPU will enter the fourth step of this read cycle.

The fourth step will be one in which the firmware will specify an LB field which uses the data that is in the data buffer, and sources it onto the Inner bus for use by the CPU. The LB field will thus enable either the DA driver 34, or the DW driver 35, depending on whether a word, 16 bits in length, or an address, 24 bits in length, is required onto the source bus. In turn, the I bus field will specify that the source bus, either all 24 bits of it, or 16 bits sign extended to 24, will be enabled onto the Inner bus. In the Inner bus, assuming that there is a 16-bit word that is being received back from the data buffer, the DA field would be used to enable the DALU to read the Inner bus, and then the DW, D select and DM fields would be controlled to address and write into one of the 32 registers in the DRAM. This would complete the fourth step of this control sequence, the first of which loaded the Y register, the second of which made the read request, the third of which waited for data to come back, and the fourth of which took the data and enabled it into one of the registers in the CPU.

A second typical sequency of operations which may be performed by the system is the manipulation of operands in an arithmetic operation, such as adding an operand which has been fetched from memory to one of the data registers and then, after the addition, returning to the data register and also placing it into the write data buffer so that it can be subsequently written back to memory. This sequence of operations would begin following the stall referred to in the previous operation. This step would be one which enabled the data, which in the case of a word operand would be a word, from the data buffer 31, via the L bus and the data multiplexers 35, onto the source bus. Then, the I bus field would specify that the source bus, sign extended via th sign extension device 52 and the data latches 51 be enabled onto the Inner bus. At the same time, the R bus control field would specify that the particular data register of interest be enabled to the R bus 13 from the DRAM 11. The DA field, i.e., the DALU control field, would then specify that the DALU be conditioned to add the 24 bits on the R bus 13 to the 24 bits on the I bus 14. This logic 15 would have as its output 24 bits representing the sum. The DW bit would indicate that the output of the DALU was to be written back into the DRAM 11.

At the same time, the output of the DALU would be enabled to the W bus via the SH field. This field would indicate that the selector 20 would be enabled to the Outer bus and would be conditioned to select the DALU output instead of the R bus output for that purpose. Also at the same time, the shifter 19 would be conditioned to pass the Outer bus contents through without change to the Write bus 84. The same LB field which specified DW 35 to the source bus 33, would also have specified that the Write bus would be enabled to the left half of the W register 28 via the selector 29. This would all take place in a single firmware step. Since this is an add operation, presumably the overflow from the add would be tested by a test specified by the test logic 30. The next address logic would generate one address which would indicate a particular entry to go to if the operand is to be written back into memory immediately. The other address, which would be to the lower bank, would be generated to take the next step which would then set the overflow indicator in the I register 57. If there was no overflow, the I register would have been automatically cleared.

The third operation would consist of writing an operand into memory. This would take three firmware steps to perform. The first would be a step in which the address in which the operand is to be written is loaded into the Y register 24. The second step would be to put the operand to be written into the W register 28. The third step would be one in which the LB field would specify that a local bus request, specifying a memory write, be addressed to the local bus for the Cache/MMU to receive and execute.

The first step, that which loads the Y register 24, would get the address presumably from one of the 16 locations in the BRAM random access store. This would be performed by conditioning the I bus field so that the I bus would look at the output of the BRAM. The B select field would indicate which of the 16 BRAM registers was addressed for this purpose. The BALU 55, which is controlled by the BA field, would be conditioned to pass the contents (24 bits) of the Inner bus to its output. The LB field would be one which specified load the Y register. Since the input to the Y register is the output of the BALU, this would transfer the contents of the selected BRAM into the Y register. The next control store step would take the operand from its origin, wherever that might be, in this case, for example, one of the 32 DRAM locations. The DS field would select which of the 32 DRAMS would be enabled. The RB field would enable the DRAM onto the R bus. The SH field would select the RAM bus to the Outer bus 17 via selector 20, and the Outer bus to the Write bus 84 via shifter 19 with no shifting taking place. The LB field would specify load the W register, left half. This would be performed by conditioning the W selector 29 to enable the right two-thirds of the Write bus to the left half of the W register,, and the W register would be enabled to load its left half.

Finally, the third firmware step would be performed. In this firmware step, the only essential operation is that the local bus field, the LB field, should specify a local bus write to memory. This would use the F and FK bits as command lines going to the local bus to indicate to the Cache/MMU that this is a memory write operation. The address would be enabled to the local bus via the virtual address selector 25 from the Y register 24. The data would be enabled to the local bus from the W register 28. The Cache/MMU memory arbitrating all local bus transfers would recognize this as a memory write cycle, and would take the address, map it, send it to memory accompanied by the data, and indicate to the memory on the system bus that this is a memory write operation.

The fourth sequence of typical operations which the CPU could perform is that in which a double precision operand is shifted some number of bits to the left or right. Presuming that the operands are both in the BRAM, that is, the two operands of interest are in the BRAM, the first firmware step would initiate the transfer of the right-hand of these two operands to the Q register. This would proceed as follows. The BS field would be conditioned to address one of the 16 locations that contains this operand in the BRAM 12. The R bus field, controlling the RAM bus 13, would be conditioned to take the BRAM output instead of the DRAM output. The SH field would be conditioned to transfer the R bus to the Outer bus via the selector 20, by enabling it to the Outer bus and selecting its input from the R bus, and would also specify that the Q register and the W bus both receive the contents of the Outer bus and would clock the Q register to load it. This would cause the operand addressed in the BRAM to be transferred to the Q register. The next step, or steps, would be those in which the shifts are actually performed. In this step, the other of the two registers containing the second operand in the BRAM is addressed by the B select field and the BRAM is enabled onto the RAM bus 13, via the RB field. Then the RAM bus would be enabled to the Outer bus via the selector 20. The SH field would take any of a number of values depending on which direction and for how many bits the shift is to be performed. The SH field is capable of selecting a left or right shift of either one, two or four bits. In any of these cases, the Q register is considered to be connected as an extension of the Outer bus, creating a 32-bit operand. Actually, it is a 40-bit operand, but the left-hand eight bits of the Outer bus are ignored. This 32-bit operand is shifted either left or right as indicated by the particular SH field. The 16 right-hand bits are returned to the Q register and the 16 left-hand bits together with the eight bits which were ignored are transferred onto the W bus. This is controlled by the SH field which has exclusive control over the shift distance.

The operand having been shifted from the Outer bus to the W bus and from the Q register back to the Q register, the SH field causes the Q register to reload the shifted operand while at the same time the BW field causes the W bus to be written into the addressed BRAM location. Thus, the contents of the B and Q registers have been shifted and returned back to the B and Q registers. The particular end effects associated with this shift, whether this is an open, circular, or arithmetic shift, are a function of the control flip-flops in the CPU. This type of step, in which the actual shifting is performed, is performed some number of times in various combinations, that is, if it were desired to shift left by five bits, then a step which resulted in a shift left by one bit would be succeeded by a step which shifted left by four bits. To shift right by three would require a shift right by two and then by one, for example.

Then, after the final shift has been performed, i.e., after the operands are now correctly aligned in the addressed BRAM location and the Q register, the final step does not cause a shift, but instead returns the Q register contents back to the BRAM location from which it was originally loaded. This would be performed as follows. The I bus field would specify that the I bus is driven by the Q register (16 bits of Q extended by eight bits of binary zeros). The DALU 15 would be controlled by the DA field so that is passed through the I bus unchanged. The SH field would be selected so that it enabled the DALU, unchanged via the selector 20, to the Outer bus 17, and again unchanged, via the shifter 19 to the W bus 84. The BW bit 50 in the firmware word would then be set to condition the loading of the BRAM from the W bus, and the BS (B select) bits would be conditioned to specify which of the 16 locations in the BRAM were to receive the shifted operand.

This would all take place in some number of firmware steps, for example, three or more. One step would be used to load the Q register creating a 40-bit operand, one or more to perform the shifting of that operand as required, and then one to return the Q register contents (the right-hand 16 bits) to the BRAM to complete the operation. p FIG. 5 illustrates the organization of the upper and lower bank control store PROMs 80 and 81 respectively, and more particularly the manner in which they are coupled or paired for maximum speed. Each of the banks of the control store includes one or more PROMs, each of which PROMS includes a plurality of electronic chips. By way of example, the storage capacity of each bank may be 1024 (1K) addressable locations, each containing 96 bits, i.e., twenty-four chips of 1K each, each location having four bits of storage. To increase the speed of operation, each bank has at least two PROMs, with one PROM faster (lower address propagation time) than the other in each bank in order to compensate for propagation time in other elements included in the control store. Two banks are utilized primarily for efficiently accommodating branch decisions derived from the current firmware word and the next address generator 44. One bank is organized to be addressed directly by the firmware word whereas the other bank (for example, the upper bank) is organized to be addressed by the firmware word and/or a derivative function of the firmware word and various logic elements included in the CPU 100. Accordingly, the upper bank requires a multiplexed input and as shall be discussed, one of the two PROMs in the upper bank is provided with a faster address propagation time than any of the other PROMs in either bank. This is done as a practical matter by utilizing two PROMs, each with an increased speed of operation, i.e., lower address propagation time.

The purpose for pairing of the control store PROMs is to reduce the amount of time necessary in order to generate the next control store address, to select data appropriate to that address, and to enable it to the input of the main control store data register, the so-called MLR 82, which is the output register of the control store. This has been done in the past by using a single set of control store PROMs and selecting the address supplied to them. In such cases, the time required to propagate data through the control store logic is the address select time, i.e., the time from the change of the address input to the PROM to the time at which the output is stable. For typical control store PROMs, this is much longer than the so-called "enable time". Control store PROMs which have an enable input, can typically be turned on and off much faster (the "enable time") than addressed outputs can be provided. Therefore, the basic approach here is to separate the control store PROMs into two groups or banks so that the respective addresses for each group, for example, one of two branch addresses, can be propagating through the control store chips simultaneously, and so that the decision as to which address to utilize can be postponed until the very last moment when the decision is implemented by enabling the output of one or the other of the two groups or banks.

In the CPU of the present invention, as with some other computers, all so-called branch operations have a selection of one of a pair of addresses, one of which addresses is explicitly provided by the control store word in the current step, and the other of which is more or less indirectly generated from data available in the current step. In the CPU of the present invention, this pair of addresses is constrained in such a way that all branches consist of selecting between two addresses, one of which is for the lower bank and the other of which is for the upper bank. The lower bank may utilize addresses in the range from 000 through 3FF (hexadecimal), and the upper bank control store addresses from 400 to 7FF (hexadecimal).

The structure used to implement this method of control store partitioning is shown in the block diagram of FIG. 5. As can be seen, the control store is partitioned into five sets of control store elements or PROMs 251 through 255. Elements 251 and 252, which, as indicated in the drawing in parenthesis, include a total of 24 control store chips (19 in element 251 and 5 in element 252) are those that contain the data for the lower bank of the control store. Elements 253, 254 and 255 (which include a total of 29 chips) are those that contain the data for the upper bank. Three types of integrated circuits are used to implement these elements. Elements 251 is made up of 19 1K (1024)×4 bit control store chips with a typical address propagation time of 60 nanoseconds. Elements 252 and 253 are made up of specifically selected 1K×4 bit control store chips with a typical address propagation time of 50 nanoseconds. Elements 254 and 255 are made up of selected 512×4 bit control store chips with a typical address propagation time of 40 nanoseconds.

There are two reasons why chips or circuits with different propagation times are used in this logic. The selected parts in elements 253, 254 and 255 are selected to be faster than their counterparts in elements 251 and 252 in order to compensate for the propagation time through the upper bank address multiplexer 256. In addition, elements 252, 254 and 255 are selected to be faster than elements 251 and 253, respectively, because of the propagation delay required in the preliminary logic 259 that is in series with their output to the MLR 82.

The upper bank address multiplexer 256, which is included in next address generator 44, is used to provide one of the two addresses that are being selected among any firmware branch. The lower bank address (the address used by the lower bank control store PROMs) is more or less directly related to the next address which is in the control store word (the NA field) and is the address which is explicitly selected in that control store word. The other address which is used for a branch, that which is used in the upper bank, is some logical derivative of the NA field or is a logically generated address from PROMs or other logic in the CPU as shown by the three inputs to MUX 256, which are selected in accordance with the branch type. This other logic, i.e., the PROMs, and the other logic, and the upper bank address multiplexer which selects it, takes additional propagation time which is not present in the address path in the lower bank. The difference between these two address paths is compensated for by the difference in the speeds of the control store chips in series with it. By utilizing one bank (i.e., the lower bank) which has a direct address path, only some of the PROMs need to have increased speed whereas if a MUX, such as MUX 256, were used for both banks, all PROMs would have to have increased speed in order to provide the same propagation time.

As has been noted, the propagation delay up to and through the upper bank address MUX 256, which is generating address bits which are received by the faster PROMs of the upper bank, are uniformly faster than their lower bank counterparts. Thus, the data at the output of each PROM is stable at approximately the same time.

The preliminary logic 259 which is connected to the output of the fastest PROMs in each bank, that is elements 252, 254 and 255, is used to perform some preliminary logic decode of the next control store word prior to latching it in MLR 82. That is, this may include the select modify logic 53 which is used to generate the address inputs for the DRAM 11 and the BRAM 12, and which address inputs have to be available early in the control store cycle. More particularly, the address inputs cannot wait to be generated after the main clock has enabled the data into the MLR, but must be generated at the input to the MLR so as to be available as sonn as the clock transition has taken place.

The sources for the two addresses which are used for selecting a control store word in the lower bank and the upper bank are as follows. The lower bank address, NA, comes directly from the control store word for the current firmware step. Thus, it is available as soon as that control store word has been clocked into the MLR 82. The address NA is an input to both elements 251 and 252. The upper bank address, at the output of multiplexer 256, i.e., the address inputs to elements 253, 254 and 255, is a logical derivative of a number of logic functions included in the CPU. The address multiplexer may by the present embodiment generate eight different functional addresses which can be used by the upper bank. These are the result of the eight possible branch types which can be specified in the control store word.

These branch types are known as X0 and X1, XA, XB, XR, XE, XW and XL as shown in the table of FIG. 6. Branch types X0 and X1, which are the most common types of branches, are basically a direct logical function of the NA field. Such branch types use the NA field, with the low order bit NA10 or NA(A) unchanged NA(A) or complemented NA($\overline{A}$). The other six branches are used for specific purposes. The XA branch is used for selecting the appropriate starting address to initiate the decode of a new instruction's opcode. The XB branch is used to perform the initial decoding of some of the address syllables which are possible in the CPU. The XR branch is used to select the starting address for the execution of the routine to read the operand in most cases, or for the execution of certain instructions which are capable of execution immediately. The XE branch is used to select among the starting addresses of the firmware routines which are used to execute the individual instruction algorithms. The XW branch is used to go to select one of a number of routines which are used to store the operand. The XL branch is used to allow a simplified firmware splatter under the control of the firmware. This branch uses the contents of the link register, which can be loaded under firmware control to control four bits of the upper bank address.

All of the major branches, XA, XB, XR, XE, XW and XL use the two high order bits (NA 1, 2) of the NA field as their high order bits, but generate the remaining eight bits for their particular address in a different manner.

The XA splatter uses the output of five (5) XA PROMs to generate bit 3 through 10 of the XA next address.

The XB splatter uses three constant signals, two binary ones (11) and a binary zero (0), then one bit which is the output of one of the bit locations of the F register 38, and four outputs from a PROM which is driven by the F register to generate bits 7 through 10 of its NA field.

The XR splatter jams three bits with three binary zeros (000), generates the next bit with the contents of a control flop (KOP) whose state relates to instruction types, and generates the last four bits, bits 7 through 10, from an XR PROM.

The third bit of the XE splatter is the aforesaid instruction type signal. The next bit indicates whether or not bit 0 of the F register is zero, the next whether bits 1 through 3 of the F register 38 are all zeros or not, and bits 4 through 8 of the F register are utilized as bits 6–10 of the NA field.

The XW splatter gives a combination of signals: a constant zero and three outputs of a PROM which decodes and classifies operand size type for bits 4 through 6. Bit 7 is a logic one, bit 8 is an output of the PROM which classifies operands as either addresses or non-addresses, and, finally two bits which are the output of an XW PROM, for bits 9 and 10 of the NA which identifies whether the result is to go to memory, to a base or data register or to a so-called K register (not shown).

The address lines for the XL branch use bits 1 through 6 of the NA field for the first six bits, and then use four bits of link register to generate the four last bits (bits 7 through 10).

These various inputs are selected by the set of eight-to-one multiplexers which are the upper bank address MUX 256. The particular address which is selected through this MUX is selected by use of the current control store word. In the current control store word, branching is performed by selecting one test condition and testing it for either being satisfied or not being satisfied. The output of this logic is two signals, one TCTRUE− or NOT TRUE, the other TCTRUE+ or TRUE. TCTRUE− is the signal on line 261 in the block diagram of FIG. 5 and TCTRUE+ is the signal on line 262. These signals are connected to the enable inputs of the respective control store PROMs.

At the beginning of a given firmware step, the NA field becomes stable and that address immediately begins propagating through the control store elements 251 and 252. As fast as the logic operates thereafter, the output of the upper bank address MUX 256 becomes stable, and that address begins propagating through control store elements 253, 254 and 255. Note that one of the address bits at the output of the MUX 256 selects between element 254 and element 255. This is because these elements are implemented with higher speed PROMs having a smaller word storage capacity. Accordingly, what is an address line for a 1K word (4 bits/word) PROM, becomes a selective enable line for two 512 word PROMs, with one enable input of PROM 255 coupled via inverter 264. More particularly, in elements 254 and 255, which are the selected 512×4 bit control store PROMs, the address bits are partitioned slightly differently. The reason for this is that a 512 word PROM only requires nine bits of address. The tenth address bit, which is an address bit to all the other control store PROMs, is instead used as a second enable on the 512×4 control store PROMs. That is, element 154 would be enabled for addresses 400 through 5FF, and since the inverse of that same address line is coupled to element 255, it would be enabled for addresses 600 through 7FF.

Thus, as fast as the addresses are available, they are propagated through the control store PROMs. Meanwhile, in parallel, the TC (test condition) logic 30, as shown in detail in FIG. 7, is deciding whether the test condition is satisfied or not satisfied, with the outputs TCTRUE− and TCTRUE+ becoming stable thereafter. If the test condition in the polarity indicated was satisfied, then the low state TCTRUE+ will enable PROMs 253, 254 and 255, while TCTRUE−, being in a high state, will disable PROMs 251 and 252. Thus, the outputs of the wired OR connections as shown by symbols 257 and 258 (76 and 20 lines coupled respectively) will be the contents of the addressed upper bank control store location. However, if the condition was not satisfied, then TCTRUE− (not TRUE) will have the other polarity or state and will enable control store elements 251 and 252, while TCTRUE+ will disable elements 253, 254 and 255. In such case, the outputs of the wired OR connections 257 and 258 will be the contents of the addressed lower bank location.

The enable time for the control store PROMs is typically 15 to 20 nanoseconds. This is significantly faster than the address propagation time for a PROM which, as noted on FIG. 5, may be, for example, 60 nanoseconds for PROM 251. Thus, the "delay" from the time when the test condition results are known has been enhanced so that the enable propagation time of the PROMs is controlling rather than the address propagation time through the PROMs. The reason that these particular concerns have been taken with the timing through this chain of logic, i.e., the propagation time through the upper bank address generation and selection, the timing through the control store PROMs, and the timing through the preliminary logic, is that the worst case time at which the data at the input to the MLR 82 must be stable, is the time at which the main clock is triggered. It is one of the major functions controlling the cycle time, and thus the speed of the CPU.

If each of the control store PROMs had a 60 nanosecond propagation time, then in the worst case, if one were selecting an upper bank address, it would take 80 nanoseconds altogether from some preliminary starting point before the input to the MLR 82 became stable. Thus, to increase the speed, the use of PROMs having three different propagation times is desirable. PROM 252 compensates for the reduced speed or slow down caused by the preliminary or select/modify logic 259. PROM 253 compensates for the increased delay in addressing due to the upper bank address MUX 256. PROM 254 and 255 compensate for both the MUX 256 and the logic 259. Thus, the worst case time through this network is almost the same no matter which bank, upper or lower, is being used, and no matter which output is generated, one that goes directly to the MLR 82 or one that goes to the logic 259, before going to the MLR. If elements 253, 254 and 255 were not faster than elements 251 and 252, the clock period would have to be longer for any firmware step in which the upper bank was the one selected. Thus, the cycle time for that control store step would be longer because there would have to be allowance for the extra time for the next address PROMs and the upper bank address MUX to generate a stable address for the control store PROMs.

The basic principle involved in the logic shown in FIG. 5 is summarized as follows. Since the address path through the control store PROMs is so much slower than the enable path, the address path is always left open, that is, the next address is trickling through the lower bank control store and the output of the address MUX 256 is trickling through the upper bank of the control store, while the decision is being made as to which bank is finally going to be used. The timing of that decision becomes critical only when it becomes time to enable the outputs of these control store PROMs, in which case the test condition generated, true or false, will enable either the lower bank or the upper bank PROMs, depending upon which way the branch is going. The enable path is a much shorter time, 60 nanoseconds for the address propagation as compared to 15 nanoseconds for the enable propagation, thus allowing the decision for bank selection to be postponed for as much as 45 nanoseconds in a typical control store step, and thereby allowing each control store step to be significantly faster.

Now referring to FIG. 7, details of the test logic 30 for generating the TCTRUE+ and TCTRUE− signals are shown. The TCTRUE+ signal is generated at the negation output of multiplexer (MUX) 302 on line 262, and the TCTRUE− signal is generated at the negation output of MUX 304 on line 261. The lines 261 and 262 are coupled to the PROMS as shown in FIG. 5. The multiplexers 302 and 304 each has eight inputs (0–7), with each like numbered input coupled to receive the same input. Such inputs are received from the eight outputs of multiplexer 300 which actually includes eight multiplexers MUX 1–MUX 8, each having eight inputs and one output. The sixty-four inputs to multiplexer 300 are each coupled to receive a test condition from various functions included in the central processing unit 100 as indicated by test logic 30. Depending upon the condition of the function tested, either the upper bank or the lower bank of the control store will be enabled and accordingly addressed. The inputs to the multiplexers which are selected and/or enabled are determined by control bits received from the current control word, i.e., firmware word from the control store.

Thus, it is desirable to branch on a variety of different signals, which may, by way of example, be sixty-four in number, such that only one signal represents the selected one of the sixty-four inputs. The logic of FIG. 7 provides this capability with minimal propagation time by use of two levels of multiplexers, one level comprising multiplexer 300 and the other level comprising multiplexer 302 and 304. The logic of FIG. 7 also enables such branching based on either of two polarities of the same signal.

The operation of the logic of FIG. 7 is as follows. One input to each of the eight multiplexers included in multiplexer 300 is selected for propagation to the negation outputs, GP0 through GP7 respectively by the three bits received at select inputs 3, 4 and 5 of each of such eight multiplexers. These three bits are received from the TC field (bits 13–15) of the firmware word. The outputs GP0–GP7 are respectively coupled to the 0–7 numbered inputs of each of the multiplexers 302 and 304. The multiplexers 302 and 304 are also coupled to receive at their enable inputs the signals CRTCSP− and CRTCSP+, respectively. The CRTCSP signals (assertion and negation) are also received from the current firmware word, and more particularly, the TP field (bit 21) thereof. Such TP field is, as with any other field in the firmware word, transferred via the register 82. For bit 21 (the TP field), the element at the bit 21 location in the register 82 is actually a bistable element (flip-flop) having both a negation and an assertion output. Depending on the logic level required for other bits of the firmware word, either or both the assertion and negation outputs are used.

The multiplexers 302 and 304, which may be purchased from a semiconductor vendor such as Texas Instruments Inc. under part number SN74S251, will allow switching of the assertion and negation outputs of the multiplexer if the signal on the enable input is low or a binary zero. If such signal on the enable input is high, the outputs are floating and accordingly, as configured, such multiplexer having a high enable input will be effectively removed from the logic of FIG. 7. Thus, as can be seen, only one of the multiplexers 302 and 304 will be enabled at any given time. The outputs of the multiplexers 302 and 304 are coupled so that the assertion output of each multiplexer is coupled to the negation output of the other multiplexer to produce a so-called wired-OR circuit connection. Thus, with either of the multiplexers 302 or 304 enabled, the TCTRUE signals are obtained with the proper polarity. The TCTRUE signal which is low or a binary zero, will enable the bank to which it is coupled. That is, if TCTRUE— is low, the lower bank will be enabled.

Thus, as can be seen from the operation of the logic of FIG. 7, if the CRTCSP— signal is high and accordingly the CRTCSP+ signal is low, then MUX 304 is active or enabled and the signal TCTRUE— reflects the level (high or low) of the one of sixty-four conditions being tested and TCTRUE+ reflects the inverse of such level. If the CRTCSP— signal is low and accordingly the CRTCSP+ signal is high, then MUX 302 is active or enabled and the signal TCTRUE+ reflects the level of the condition being tested and TCTRUE— reflects the inverse of such level. Whether the upper or lower bank of the control store is enabled, depends upon which of the signals TCTRUE— or TCTRUE+ is low.

It can be seen that the opcode of an instruction read from memory 106 may be utilized to select one of several test conditions, which test conditions may be different from those received by MUX 300. In such case, the opcode bits could be utilized to select the test condition inputs to a first MUX similar to MUX 300 or a subportion thereof, and two multiplexers similar to multiplexers 302 and 304 could also be used in an arrangement similar to that shown in FIG. 7. It can also be seen that the use of the opcode to so select a test condition could be used independent of or in parallel with the logic of FIG. 7. If used in parallel, then the multiplexers 302 and 304 controlled by the firmware bits would have to be disabled when the multiplexers controlled by the opcode are enabled and vice versa.

Figure 8:
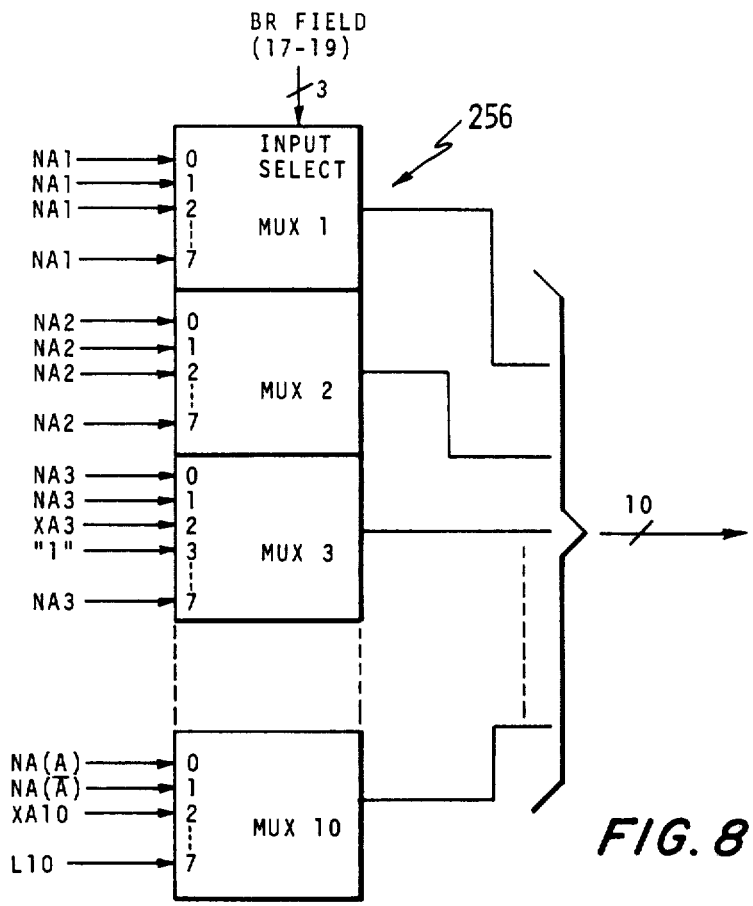
FIG. 8 illustrates the details of a multiplexer used in addressing the control store included in the central processor of the present invention.

Details of the MUX 256 and the connections thereto are shown in FIG. 8. More particularly, the MUX 256 is shown to include ten multiplexers each with eight inputs. The inputs to these ten multiplexers correspond to the signals identified in the table of FIG. 6. These signals are coupled for the eight branch types depicted in FIG. 6, such that the first signal for each of the branch types is received at the corresponding eight inputs of MUX 1 included in multiplexer 256. Thus, MUX 1 has coupled to each of its eight inputs the signal NA1. MUX 2 also has the same signal (NA2) coupled to each of its inputs. For each of the other multiplexers of MUX 256, except for the first two inputs, the signals coupled to the inputs are, for the most part, different. For example, MUX 3 has coupled to its number three input, the signal XA3 which, as shown in FIG. 6, is the third bit of the upper bank address for the XA branch, such third bit being a bit from position 3 of a so-called XA PROM which is not shown, but which may simply be a decoder coupled to receive its primary inputs from the F register 38 and whose output is coupled for receipt by MUX 3 of multiplexer 256.

The other inputs of the remaining multiplexers of MUX 256 also receive the inputs as depicted in FIG. 6. The first two inputs of MUX 10, NA(A) and NA($\overline{A}$) are of further interest. More particularly, the use of these two bits, one the complement of the other, allows more flexible and efficient pairing of control store (PROM) locations for branch operations. In the prior art, it has been known to branch on a branch hit condition to an odd PROM location and to branch on a branch no-hit condition to an even location, or vice versa. However, such prior art technique has limitations. For example, assuming four consecutive locations whose addresses are XXX00, XXX01, XXX10 and XXX11 (where X is either a binary 1 or a binary 0), a sequence which is branching can go to address XXX00 or XXX01 depending on a no-hit or hit condition, or another sequence can go to address XXX10 or XXX11. However, even if locations XXX11 and XXX01 contain exactly the same information, they cannot be shared, i.e., two locations have to be used even for the same contents. This is because both addresses are odd and the only pairing allowed is for odd/even addresses. In another prior art technique, a no-hit condition could be made to cause the addressing of the location specified by the control store word and a hit condition could cause the addressing of a location specified by the higher order address bits with the two lowest order bits, for example, both being binary ones. In this manner, an address whose two lowest order bits were both binary ones, could be paired with addresses whose two lowest ordered bits were either two binary zeros or a binary one and a binary zero (in either order). However this restricted the common address to an address which had its two lowest ordered bits binary ones (or vice versa, i.e., two binary zeros with appropriate change of the other paired addresses to one whose two lowest ordered bits are either both binary ones or a binary one and a binary zero).

In a data processing unit which allows a variety of sources to generate or form the next address for the control store, the use of the arrangement as shown in the Figures, more specifically FIGS. 5 and 8, is desirable. More particularly, the logic shown in such Figures allows a reduction in the total number of firmware or control store locations by allowing all locations to be used as alternates to an increased number of selected locations. In order to accomplish this, the least significant bit position (NA10) is coupled so that for the X0 branch, NA10 is in fact the same as the NA10 bit, NA(A), received from register 82 for the current control store word, whereas, for the X1 branch, the complement of such bit NA(A), is used.

Figure 9:
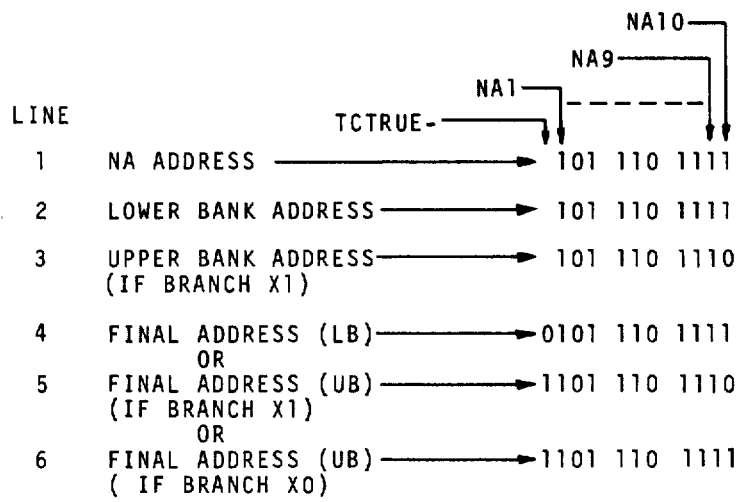
FIG. 9 illustrates an example of the operation of pairing locations in the control store included in the central processor of the present invention.

By way of example, FIG. 9 should be referenced. If the NA address is as shown on the first line, then the lower bank address is, as shown, the same. The upper bank address is however dependent upon whether there is an X0 or X1 branch. If an X1 branch, then the upper bank address is shown in the third line. The final address depends upon whether the signal TCTRUE— is a binary zero or one. If a binary zero, then the lower bank PROMs will be enabled. Thus, as shown in the fourth line, the final address will be for the lower bank if TCTRUE— is a binary zero. If TCTRUE— is a binary one, then the final address will be for the upper bank and depending upon whether the branch is X1 or X0, the final address will be as shown in lines 5 and 6 respectively of FIG. 9. More particularly, it can be seen that the lower bank address on line 4 may be paired with either of the addresses for the upper bank as shown on lines 5 and 6.

In this manner, more efficient pairing of locations may be obtained. Variations of the example shown in FIG. 9 will illustrate that an even address location of the lower bank may be paired with an even or odd address location of the upper bank, and that an odd address location of the lower bank may also be paired with either an even or odd address location in the upper bank.

It can be seen that the above described pairing could be accomplished by setting the binary value of the NA10 bit independent of the binary value of the NA10 bit of the current firmware word. For example, the NA10 bit for the X0 branch may have been set to a binary one instead of NA(A), so long as the NA10 bit for the X1 branch is its complement, in this case, a binary zero.

Having described the invention, what is claimed as new and novel and for which it is desired to secure Letters Patent is:

1. In a data processing system wherein a processor executes a series of addressable microinstructions to control the functions performed by the system and wherein the execution of a microinstruction by the processor generates the address of the next microinstruction to be executed and a next address selection signal having either a first value or a second value, a microinstruction storage and transfer apparatus comprising:

a microinstruction output register;
a control store comprising:
a first memory for storing microinstructions in a first plurality of storage locations, said first memory being addressed by said microinstruction addresses generated by said processor, said first memory for selectively outputting from a first output terminal microinstructions stored in said first plurality of storage locations responsive to said addresses generated by said processor and having a first output enable terminal for controlling the outputting of a said addressed microinstruction from said first output terminal;

a second memory for storing microinstructions in a second plurality of storage locations, said second memory normally being addressed by said microinstruction addresses generated by said processor concurrently with said addressing of said first memory, said second memory for selectively outputting from a second output terminal microinstructions stored in said second plurality of storage locations responsive to said addresses generated by said processor and said second memory having a second output enable terminal for controlling the outputting of said addressed microinstructions from said second output terminal;

means for coupling said outputs of said first memory and said second memory to said microinstruction output register;

and means for concurrently supplying said next address selection signal to said first output enable terminal and said second enable terminal to enable said first memory to output said addressed microinstructions when said next address selection signal has said first value and to enable said second memory to output said addressed microinstructions when said next address selection signal has said second value.

2. A microinstruction storage and transfer apparatus according to claim 1 further including:

an alternate source of microinstructions including microinstructions correlated thereto; and an address multiplexer having a first input terminal for receiving said microinstruction addresses generated by said processor and a second input terminal for receiving said microinstruction addresses from said alternate source of microinstruction addresses, and an output terminal connected to said second memory, said multiplexer selecting among said addresses received at said first second input terminals and for supplying said selected addresses to said second memory for the addressing of microinstructions stored therein.

3. A microinstruction storage and transfer apparatus according to claim 1 wherein said first memory and said second memory comprises read only memory memories.

* * * * *